United States Patent
Schlaupitz (10) Patent No.: US 12,418,080 B2
(45) Date of Patent: Sep. 16, 2025

(54) ELECTROCHEMICAL BATTERY MODULE AND METHOD THEREFOR

(71) Applicant: GM GLOBAL TECHNOLOGY OPERATIONS LLC, Detroit, MI (US)

(72) Inventor: Christopher Schlaupitz, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 496 days.

(21) Appl. No.: 18/160,709

(22) Filed: Jan. 27, 2023

(65) Prior Publication Data

US 2024/0258660 A1    Aug. 1, 2024

(51) Int. Cl.
| | |
|---|---|
| *H01M 50/564* | (2021.01) |
| *C09J 9/02* | (2006.01) |
| *H01M 10/04* | (2006.01) |
| *H01M 50/107* | (2021.01) |
| *H01M 50/152* | (2021.01) |
| *H01M 50/531* | (2021.01) |

(52) U.S. Cl.
CPC ............. *H01M 50/564* (2021.01); *C09J 9/02* (2013.01); *H01M 10/0422* (2013.01); *H01M 10/0431* (2013.01); *H01M 10/049* (2013.01); *H01M 50/107* (2021.01); *H01M 50/152* (2021.01); *H01M 50/531* (2021.01)

(58) Field of Classification Search
CPC ............. H01M 50/564; H01M 50/107; H01M 50/531; H01M 50/152; H01M 10/0422; H01M 10/0431; C09J 9/02
See application file for complete search history.

(56) References Cited

U.S. PATENT DOCUMENTS

| | | | |
|---|---|---|---|
| 2017/0077487 A1* | 3/2017 | Coakley | H05K 1/118 |
| 2019/0372078 A1* | 12/2019 | Golubkov | H01M 50/548 |
| 2022/0311103 A1* | 9/2022 | Findlay | H01M 50/516 |

* cited by examiner

*Primary Examiner* — Milton I Cano
(74) *Attorney, Agent, or Firm* — Quinn IP Law (57) ABSTRACT

A method for assembling a battery cell includes assembling an electrode stack that includes first electrodes, second electrodes, and separators. A first conductive adhesive pad is formed on an end cap, wherein the first conductive adhesive pad electrically couples to a first terminal arranged on the end cap. A second conductive adhesive pad is formed on an enclosure, wherein the second conductive adhesive pad electrically couples to a second terminal arranged on the enclosure. The end cap is installed onto the electrode stack with the first cell tabs engaging the first conductive adhesive pad. The electrode stack is inserted into the enclosure such that the plurality of second cell tabs engages the second conductive adhesive pad. The end cap is assembled onto the enclosure.

20 Claims, 10 Drawing Sheets

ELECTROCHEMICAL BATTERY MODULE AND METHOD THEREFOR

INTRODUCTION

The disclosure relates to an electrochemical battery module, and a method of fabricating the battery module.

Battery modules may be constructed from a plurality of electrochemical cells that are electrically interconnected. Each of the electrochemical cells includes a positive terminal and a negative terminal, with selected terminals of each of the electrochemical cells being soldered or welded to mechanically attach and electrically connect the cells to positive and negative terminals of the battery module.

There is a need to provide an improved battery module and an improved process for mechanically and electrically joining elements of a battery module.

SUMMARY

The concepts described herein provide a battery module having positive and negative terminals that are electrically connected and weldlessly, mechanically joined to an electrode stack employing an electrically conductive mechanically adhesive material.

An aspect of the disclosure may include a method for assembling a battery cell that includes assembling an electrode stack, wherein the electrode stack includes a plurality of first electrodes, a plurality of second electrodes, and a plurality of separators; wherein each first electrode includes a first collector and a first cell tab, wherein each second electrode includes a second collector and a second cell tab, wherein a plurality of the first cell tabs extends from the electrode stack in a first longitudinal direction, and wherein a plurality of the second cell tabs extends from the electrode stack in a second longitudinal direction that is opposed to the first longitudinal direction. The process continues by forming a first conductive adhesive pad on an end cap, wherein the first conductive adhesive pad electrically couples to a first terminal arranged on the end cap; forming a second conductive adhesive pad on an enclosure, wherein the second conductive adhesive pad electrically couples to a second terminal arranged on the enclosure; installing the end cap onto the electrode stack such that the plurality of the first cell tabs engages the first conductive adhesive pad; inserting the electrode stack into the enclosure such that the plurality of the second cell tabs engages the second conductive adhesive pad; and assembling the end cap onto the enclosure.

Another aspect of the disclosure may include installing the end cap onto the electrode stack such that the plurality of the first cell tabs electrically connects to the first conductive adhesive pad.

Another aspect of the disclosure may include inserting the electrode stack into the enclosure such that the plurality of the second cell tabs electrically connects to the second conductive adhesive pad.

Another aspect of the disclosure may include assembling the electrode stack by forming the plurality of first electrodes, the plurality of second electrodes, and the plurality of separators as planar sheets; and alternatingly stacking one of the plurality of first electrodes, and one the plurality of second electrodes with one of the plurality of separators interposed therebetween to form an intermediate stack, wherein the first cell tab extends outwardly therefrom in the first longitudinal direction, and wherein the second cell tab extends outwardly therefrom in the second longitudinal direction; and rolling the intermediate stack into a cylindrical shape.

Another aspect of the disclosure may include curing the first conductive adhesive pad subsequent to installing the end cap onto the electrode stack with the plurality of the first cell tabs to electrically connect the first cell tabs to the first terminal arranged on the end cap and weldlessly mechanically join the first cell tabs to the end cap.

Another aspect of the disclosure may include curing the second conductive adhesive pad subsequent to assembling the end cap onto the enclosure to electrically connect the second cell tabs to the enclosure and weldlessly mechanically join the second cell tabs to the second terminal arranged on the enclosure.

Another aspect of the disclosure may include forming the first conductive adhesive pad on the end cap by applying a malleable curable conductive adhesive material onto a surface of the end cap.

Another aspect of the disclosure may include the malleable curable conductive adhesive material being a thermosetting polymer.

Another aspect of the disclosure may include forming the second conductive adhesive pad on the enclosure by applying a malleable curable conductive adhesive material onto an inner surface of the enclosure.

Another aspect of the disclosure may include curing the first conductive adhesive pad by applying heat to the first conductive adhesive pad.

Another aspect of the disclosure may include a method for assembling a battery cell, which includes assembling an electrode stack, wherein the electrode stack includes a plurality of first electrodes, a plurality of second electrodes, and a plurality of separators; wherein each first electrode includes a first collector and a first cell tab, wherein each second electrode includes a second collector and a second cell tab, wherein a plurality of the first cell tabs extends from a first end of the electrode stack, and wherein a plurality of the second cell tabs extends from a second end of the electrode stack; forming a first conductive adhesive pad on a first end cap, wherein the first conductive adhesive pad electrically couples to a first terminal on the first end cap; installing the first end cap onto the first end of the electrode stack such that the plurality of the first cell tabs engages the first conductive adhesive pad; forming a second conductive adhesive pad on an enclosure, wherein the second conductive adhesive pad electrically couples to a second terminal arranged on the enclosure; inserting the electrode stack into the enclosure such that the plurality of the second cell tabs engages the second conductive adhesive pad; and assembling the end cap onto the enclosure.

Another aspect of the disclosure may include installing the end cap onto the electrode stack such that the plurality of the first cell tabs engages the first conductive adhesive pad by installing the end cap onto the electrode stack such that the plurality of the first cell tabs electrically connects to the first conductive adhesive pad.

Another aspect of the disclosure may include inserting the electrode stack into the enclosure such that the plurality of the second cell tabs engages the second conductive adhesive pad by inserting the electrode stack into the enclosure such that the plurality of the second cell tabs electrically connects to the second conductive adhesive pad.

Another aspect of the disclosure may include assembling the electrode stack by forming the plurality of first electrodes, the plurality of second electrodes, and the plurality of separators as planar sheets; and alternatingly stacking one of the plurality of first electrodes and one the plurality of second electrodes with one of the plurality of separators interposed therebetween, wherein the first cell tab extends outwardly from the first end of the electrode stack, and wherein the second cell tab extends outwardly from the second end of the electrode stack.

Another aspect of the disclosure may include curing the first conductive adhesive pad subsequent to installing the end cap onto the electrode stack with the plurality of the first cell tabs to electrically connect the first cell tabs to the first terminal arranged on the end cap and weldlessly mechanically join the first cell tabs to the end cap; and curing the second conductive adhesive pad subsequent to assembling the end cap onto the enclosure to electrically connect and weldlessly mechanically join the second cell tabs to the second terminal arranged on the enclosure.

Another aspect of the disclosure may include a method for assembling a battery cell that includes assembling an electrode stack, wherein the electrode stack includes a plurality of first electrodes, a plurality of second electrodes, and a plurality of separators; wherein each first electrode includes a first collector and a first cell tab, wherein each second electrode includes a second collector and a second cell tab, wherein a plurality of the first cell tabs extends from a first side of a first end of the electrode stack, and wherein a plurality of the second cell tabs extends from a second side of the first end of the electrode stack; forming a first conductive adhesive pad on a first side of an end cap, wherein the first conductive adhesive pad electrically couples to a first terminal on the end cap; forming a second conductive adhesive pad on a second side of the end cap, wherein the second conductive adhesive pad electrically couples to a second terminal on the end cap; installing the end cap onto the electrode stack such that the plurality of the first cell tabs engages the first conductive adhesive pad and the plurality of the second cell tabs engages the second conductive adhesive pad; inserting the electrode stack including the end cap into an enclosure; and assembling the end cap onto the enclosure.

Another aspect of the disclosure may include installing the end cap onto the electrode stack such that the plurality of the first cell tabs engages the first conductive adhesive pad by installing the end cap onto the electrode stack such that the plurality of the first cell tabs electrically connects to the first conductive adhesive pad.

Another aspect of the disclosure may include inserting the electrode stack into the enclosure such that the plurality of the second cell tabs engages the second conductive adhesive pad by installing the end cap onto the electrode stack such that the plurality of the second cell tabs electrically connects to the second conductive adhesive pad.

Another aspect of the disclosure may include assembling the electrode stack by forming the plurality of first electrodes, the plurality of second electrodes, and the plurality of separators as planar sheets; and alternatingly stacking one of the plurality of first electrodes, and one of the plurality of second electrodes with one of the plurality of separators interposed therebetween, wherein the first cell tab is arranged on the first side, and wherein the second cell tab is arranged on the second side.

Another aspect of the disclosure may include curing the first conductive adhesive pad subsequent to installing the end cap onto the electrode stack with the plurality of the first cell tabs to electrically connect the first cell tabs to the first terminal arranged on the end cap and weldlessly mechanically join the first cell tabs to the end cap; and curing the second conductive adhesive pad subsequent to installing the end cap onto the electrode stack with the plurality of the second cell tabs to electrically connect the second cell tabs to the second terminal arranged on the end cap and weldlessly mechanically join the second cell tabs to the end cap.

Another aspect of the disclosure may include an electrochemical battery module that includes an electrode stack, wherein the electrode stack includes a plurality of first electrodes, a plurality of second electrodes, and a plurality of separators; an end cap, the end cap having a first conductive adhesive pad, a first terminal, a second conductive adhesive pad, and a second terminal; and an enclosure. The electrode stack is arranged within the enclosure and the end cap; the first conductive adhesive pad electrically couples to the first terminal; the second conductive adhesive pad electrically couples to the second terminal; the plurality of first electrodes is electrically coupled to the first terminal via the first conductive adhesive pad; and the plurality of second electrodes is electrically coupled to the second terminal via the second conductive adhesive pad.

Another aspect of the disclosure may include each of the plurality of first electrodes including a first collector and a first cell tab; each of the plurality of second electrodes including a second collector and a second cell tab; each of the first cell tabs of the plurality of first electrodes being electrically coupled to the first terminal and mechanically joined to the end cap via the first conductive adhesive pad; and each of the second cell tabs of the plurality of second electrodes being electrically coupled to the second terminal and mechanically joined to the end cap via the second conductive adhesive pad.

Another aspect of the disclosure may include the plurality of first electrodes, the plurality of second electrodes, and the plurality of separators being arranged as planar sheets; and the plurality of first electrodes and the plurality of second electrodes being alternatingly stacked with one of the plurality of separators interposed therebetween.

Another aspect of the disclosure may include the enclosure being arranged as a cylindrical device; wherein the plurality of first electrodes, the plurality of second electrodes, and the plurality of separators are arranged in a cylindrical shape and inserted into the enclosure.

Another aspect of the disclosure may include the plurality of first electrodes being mechanically joined to the end cap via the first conductive adhesive pad; and the plurality of second electrodes being mechanically joined to the end cap via the second conductive adhesive pad.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which:

FIGS. 1-1 through 1-4 schematically illustrate aspects of a cutaway sideview of a cylindrical battery assembly, in accordance with the disclosure.

FIG. 1-5 pictorially illustrates a cylindrical battery assembly, in accordance with the disclosure.

FIGS. 2-1 through 2-4 schematically illustrate aspects of a cutaway sideview of an embodiment of a prismatic battery assembly, in accordance with the disclosure.

FIG. 2-5 pictorially illustrates an embodiment of a prismatic battery assembly, in accordance with the disclosure.

FIGS. 3-1 through 3-4 schematically illustrate aspects of a cutaway sideview of an embodiment of a prismatic battery assembly, in accordance with the disclosure.

FIG. 3-5 pictorially illustrates an embodiment of a prismatic battery assembly, in accordance with the disclosure.

FIGS. 4-1 through 4-5 schematically illustrate aspects of a cutaway sideview of an embodiment of a pouch battery assembly, in accordance with the disclosure.

FIGS. 5-1 through 5-5 schematically illustrate aspects of a cutaway sideview of an embodiment of a pouch battery assembly, in accordance with the disclosure.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure.

Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by an expressed or implied theory presented herein. Throughout the drawings, corresponding reference numerals indicate like or corresponding parts and features.

For the sake of brevity, some components and techniques and other functional aspects of the systems (and the individual operating components of the systems) may not be described in detail herein. Furthermore, the connecting lines shown in the various figures contained herein are intended to represent example functional relationships and/or physical couplings between the various elements. Many alternative or additional functional relationships or physical connections may be present in an embodiment of the disclosure.

FIGS. 1-1 through 1-5 illustrate details related to an embodiment of a cylindrical battery cell (or battery module) 100 and a related assembly process, wherein positive and negative terminals are electrically connected and weldlessly, mechanically joined to an electrode stack employing an electrically conductive mechanically adhesive material. The battery cell 100 includes an electrode stack 110 that is contained with an enclosure 140 and an end cap 130. The enclosure 140 includes and defines a first terminal 142, and the end cap 130 includes a second terminal 132. When assembled, the electrode stack 110 is sealed within the enclosure 140 using the end cap 130. In one embodiment, the end cap 130 includes an electrical isolator 134 that electrically isolates the second terminal 132 from the end cap 130, as illustrated with reference to FIG. 1-4.

As employed herein, the terms "seal", "sealed", and related terms refer to fastening or attaching the joined elements or members such that the sealed portion prevents passage of liquids, gases, solids, gelids, etc., therethrough.

Figure 11:
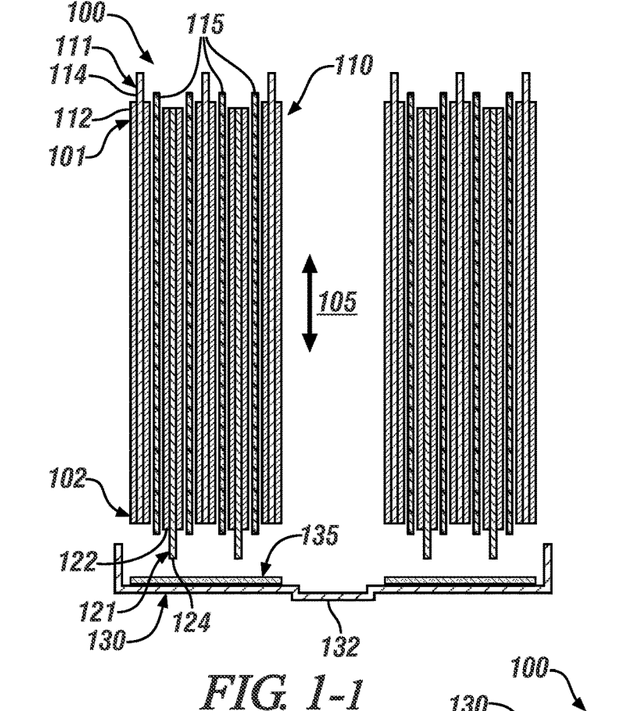

The electrode stack 110 has a plurality of alternating first and second electrodes 111, 121, respectively, that are arranged with separators 115 interposed therebetween. In one non-limiting embodiment, and as shown, the first electrode 111 is an anode, and the second electrode 121 is a cathode. Each first electrode 111 includes a first collector 112 and a first cell tab 114 that projects outwardly in a longitudinal direction 105 from a first end 101 of the electrode stack 110. Each second electrode 121 includes a second collector 122 and a second cell tab 124 that projects outwardly in the longitudinal direction 105 from a second end 102 of the electrode stack 110.

The electrode stack 110 is created by forming each of the first electrodes 111, the second electrodes 121, and the separators 115 as planar sheets, and alternatingly stacking the first electrodes 111 and the second electrodes 121 with one of the separators 115 interposed therebetween to form an intermediate stack (not shown). The first cell tabs 114 project outwardly in the longitudinal direction 105 from the first end 101 of the electrode stack 110 and the second cell tabs 124 project outwardly in the longitudinal direction 105 from the second end 102 of the electrode stack 110. The intermediate stack is wound or rolled into a cylindrical shape for further processing and assembly.

In one embodiment, the first electrodes 111 are composed as anodes that include a lithium host material such as graphite, silicon, or lithium titanate that is arranged on the first collector 112, which is a copper or copper alloy current collector. In one embodiment, the second electrodes 121 are composed as cathodes that include lithium-based active material that stores intercalated lithium at a higher electrochemical potential than the lithium host material used to make the anode, and is arranged on the second collector 122, which is an aluminum or aluminum alloy current collector. The separators 115 are each composed of one or more porous polymer layers that individually may be composed of one or a wide variety of polymers. Each of the one or more polymer layers may be a polyolefin. The polymer layer(s) function to electrically insulate and physically separate the first and second electrodes 111, 121.

The second end 102 of the electrode stack 110 is assembled onto the end cap 130 so that the second cell tabs 124 of the second electrodes 121 electrically connect to the second terminal 132 of the end cap 130, and weldlessly mechanically join the second cell tabs 124 to the end cap 130 via a second conductive adhesive pad 135.

The second conductive adhesive pad 135 is a malleable curable electrically conductive adhesive material.

The malleable curable electrically conductive adhesive material may be fabricated by loading an adhesive component with conductive fillers. Non-limiting examples of adhesive materials include organic or synthetic resins, varnish, or silicone. Non-limiting examples of conductive fillers include metals, metal oxides, or metal nitrides such as aluminum, copper, silver, nickel, and graphite in their various forms.

The second conductive adhesive pad 135 is formed from a conductive adhesive material that may be cured by various methods such as heat cure, air drying cure, moisture cure, radiation cure or using a hardener agent, e.g., a 2-part adhesive. In one embodiment, the malleable curable conductive adhesive material includes a thermosetting polymer that is curable in place without additional processing steps.

The malleable curable conductive adhesive is applied onto a surface of the end cap in an uncured state to form the second conductive adhesive pad 135, and is subjected to a curing process after assembly of the battery cell 100.

When the malleable curable conductive adhesive is a thermosetting polymer, the curing process may require the addition of heat to effect curing.

Figure 12:
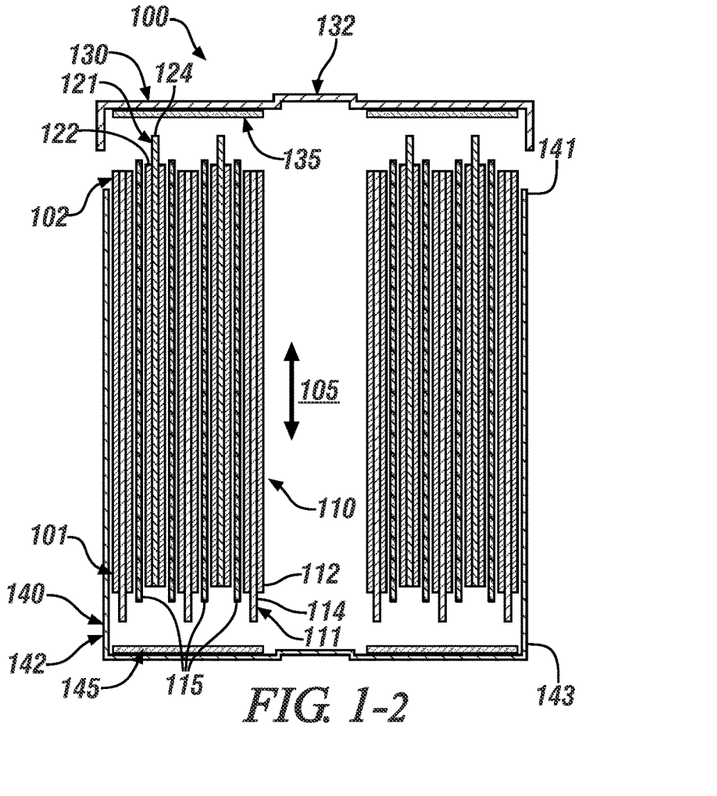

Subsequent to assembling the second end 102 of the electrode stack 110 onto the end cap 130, the first end 101 of the electrode stack 110 is inserted into the enclosure 140. This is schematically illustrated with reference to FIG. 1-2. The enclosure 140 is arranged as a cylindrical device fabricated from a conductive polymer or other material, and has an open first end 141 and a closed second end 143. All or a portion of the enclosure 140 may function as the first terminal 142.

The malleable curable conductive adhesive is applied onto an interior portion of the second end 143 of the enclosure 140 in an uncured state to form a first conductive adhesive pad 145, and electrically connects to the first terminal 142. The malleable curable conductive adhesive of the first conductive adhesive pad 145 is subjected to a curing process after assembly of the battery cell 100.

Figure 13:
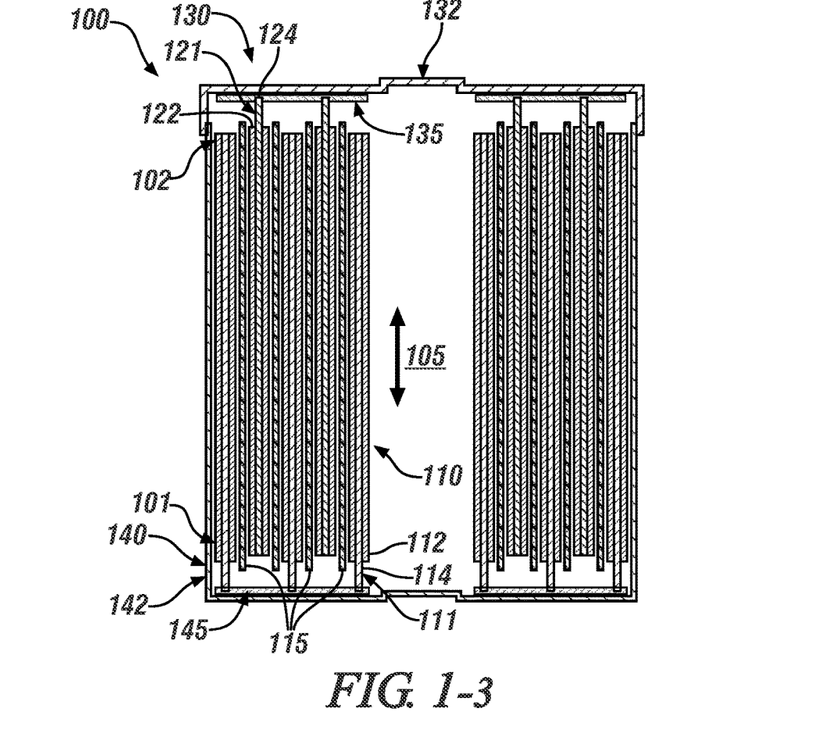
Figure 14:
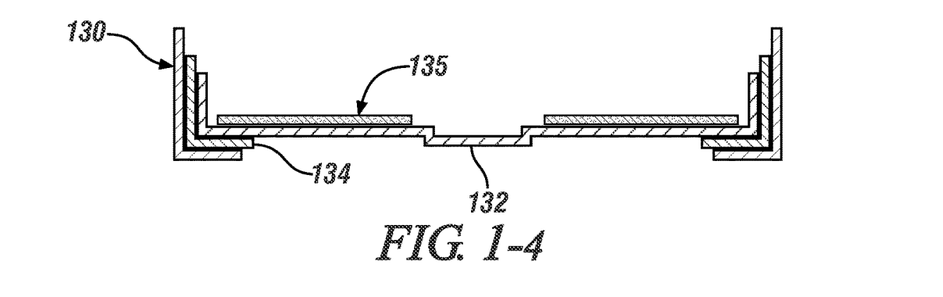
Figure 15:
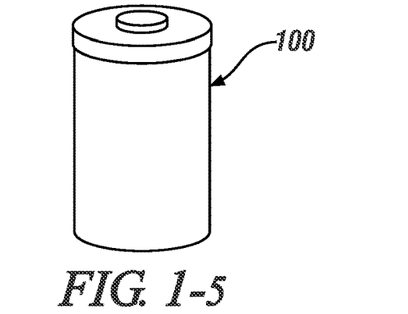

The end cap 130 is sealably attached to the enclosure 140 to form the battery cell 100, as illustrated with reference to FIG. 1-3, with an embodiment of the battery cell 100 being pictorially illustrated with reference to FIG. 1-5.

This arrangement for assembling the cylindrical battery cell 100 enables the electrode stack 110 to be wound without notching or folding, thus permitting it to be inserted directly into the enclosure 140 with a pre-applied conductive adhesive and absent interconnects. The end cap 130 may be adhered directly to the wound electrode stack 110 with conductive adhesive.

FIGS. 2-1 through 2-5 illustrate details related to an embodiment of a prismatic N-type battery cell (or battery module) 200 and a related assembly process, wherein positive and negative terminals are electrically connected and weldlessly, mechanically joined to an electrode stack employing an electrically conductive mechanically adhesive material. The battery cell 200 includes an electrode stack 210 that is contained with an enclosure 240 and an end cap 230. The enclosure 240 includes and defines a first terminal 242, and the end cap 230 includes a second terminal 232. When assembled, the electrode stack 210 is sealed within the enclosure 240 using the end cap 230. In one embodiment, the end cap 230 includes an electrical isolator 234 that electrically isolates the second terminal 232 from the end cap 230, as illustrated with reference to FIG. 2-4.

Figure 21:
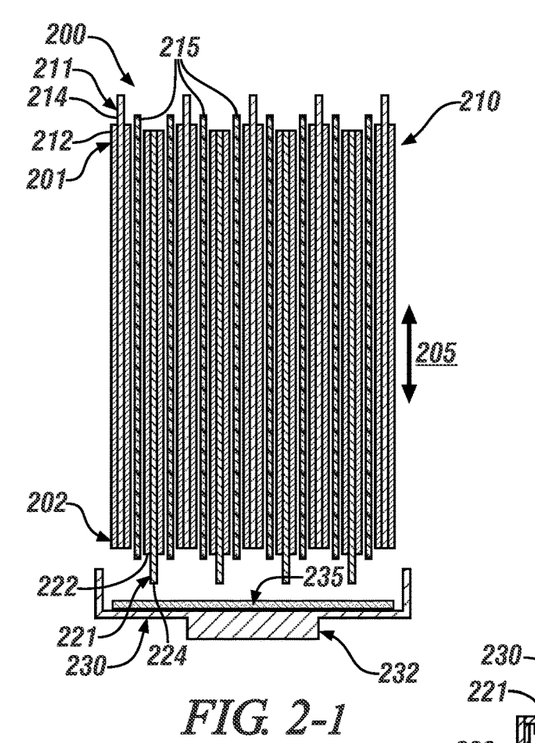

The electrode stack 210 has a plurality of alternating first and second electrodes 211, 221, respectively, that are arranged with separators 215 interposed therebetween. In one non-limiting embodiment, and as shown, the first electrode 211 is an anode, and the second electrode 221 is a cathode. Each first electrode 211 includes a first collector 212 and a first cell tab 214 that projects outwardly in a longitudinal direction 205 from a first end 201 of the electrode stack 210. Each second electrode 221 includes a second collector 222 and a second cell tab 224 that projects outwardly in the longitudinal direction 205 from a second end 202 of the electrode stack 210.

The electrode stack 210 is created by forming each of the first electrodes 211, the second electrodes 221, and the separators 215 as planar sheets, and alternatingly stacking the first electrodes 211 and the second electrodes 221 with one of the separators 215 interposed therebetween to form an intermediate stack (not shown). The first cell tabs 214 project outwardly in the longitudinal direction 205 from the first end 201 of the electrode stack 210 and the second cell tabs 224 project outwardly in the longitudinal direction 205 from the second end 202 of the electrode stack 210.

In one embodiment, the first electrodes 211 are composed as anodes that include a lithium host material such as graphite, silicon, or lithium titanate that is arranged on the first collector 212, which is a copper or copper alloy current collector. In one embodiment, the second electrodes 221 are composed as cathodes that include lithium-based active material that stores intercalated lithium at a higher electrochemical potential than the lithium host material used to make the anode, and is arranged on the second collector 222, which is an aluminum or aluminum alloy current collector. The separators 215 are each composed as one or more porous polymer layers that individually may be composed of one or a wide variety of polymers. Each of the one or more polymer layers may be a polyolefin. The polymer layer(s) function to electrically insulate and physically separate the first and second electrodes 211, 221.

The second end 202 of the electrode stack 210 is assembled onto the end cap 230 so that the second cell tabs 224 of the second electrodes 221 electrically connect to the second terminal 232 of the end cap 230, and weldlessly mechanically join the second cell tabs 224 to the end cap 230 via a second conductive adhesive pad 235.

The second conductive adhesive pad 235 is a malleable curable conductive adhesive material. The malleable curable conductive adhesive is applied onto a surface of the end cap in an uncured state to form the second conductive adhesive pad 235, and is subjected to a curing process after assembly of the battery cell 200.

Figure 22:
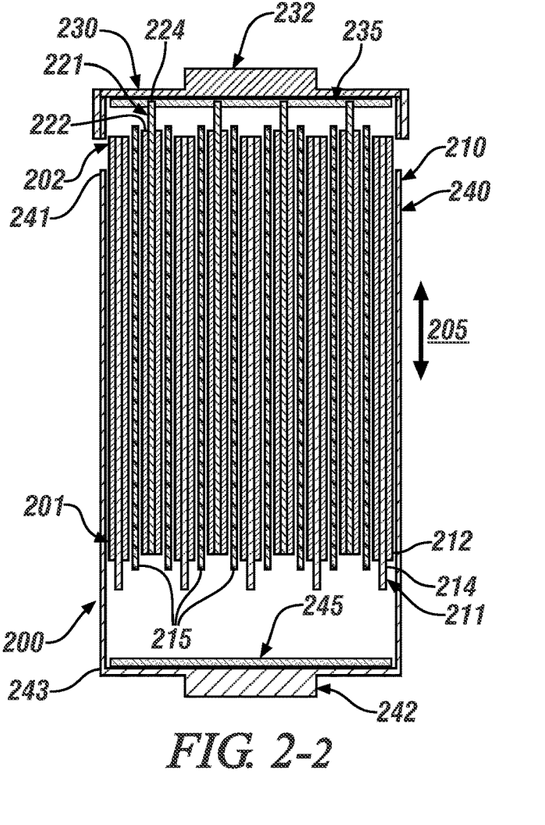

Subsequent to assembling the second end 202 of the electrode stack 210 onto the end cap 230, the first end 201 of the electrode stack 210 is inserted into the enclosure 240. This is schematically illustrated with reference to FIG. 2-2. The enclosure 240 is arranged as a rectangular prism device fabricated from a conductive polymer or other material, and has an open first end 241 and a closed second end 243. All or a portion of the enclosure 240 may function as the first terminal 242.

The malleable curable conductive adhesive is applied onto an interior portion of the second end 243 of the enclosure 240 in an uncured state to form the first conductive adhesive pad 245, and electrically connects to the first terminal 242. The malleable curable conductive adhesive is subjected to a curing process after assembly of the battery cell 200.

Figure 23:
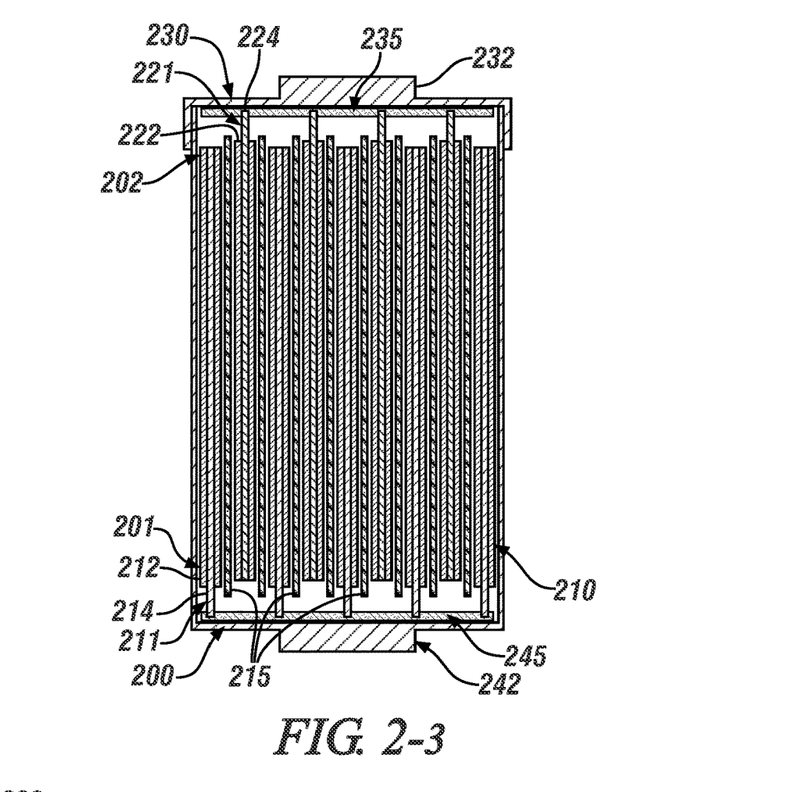
Figure 24:
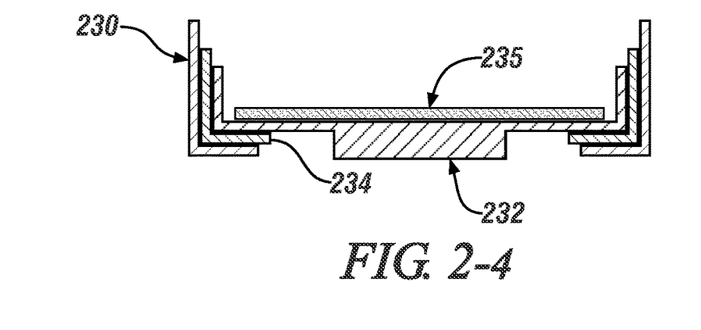
Figure 25:
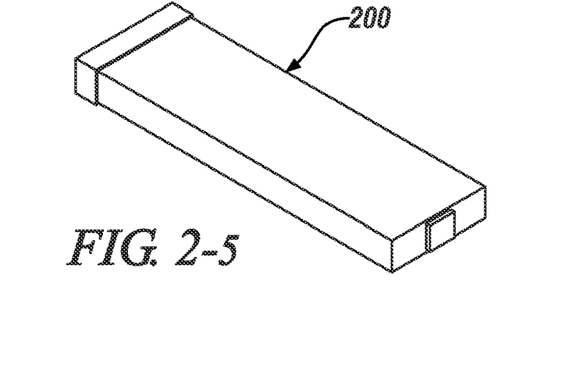

The end cap 230 is sealably attached to the enclosure 240 to form the battery cell 200, as illustrated with reference to FIG. 2-3, with embodiments of the battery cell 200 being pictorially illustrated with reference to FIG. 2-5.

This arrangement for assembling the prismatic N-type battery cell 200 enables the electrode stack 210 to be assembled without notching or folding, thus permitting it to be inserted directly into the enclosure 240 with a pre-applied conductive adhesive and without interconnects. The end cap 230 may be adhered directly to the electrode stack 210 with conductive adhesive.

FIGS. 3-1 through 3-5 illustrate details related to an embodiment of a prismatic P-type battery cell (or battery module) 300 and a related assembly process, wherein positive and negative terminals are electrically connected and weldlessly, mechanically joined to an electrode stack employing an electrically conductive mechanically adhesive material. The battery cell 300 includes an electrode stack 310 that is contained with an enclosure 340 and an end cap 330. The end cap 330 includes a first terminal 342 and a second terminal 332. When assembled, the electrode stack 310 is sealed within the enclosure 340 using the end cap 330.

Figure 31:
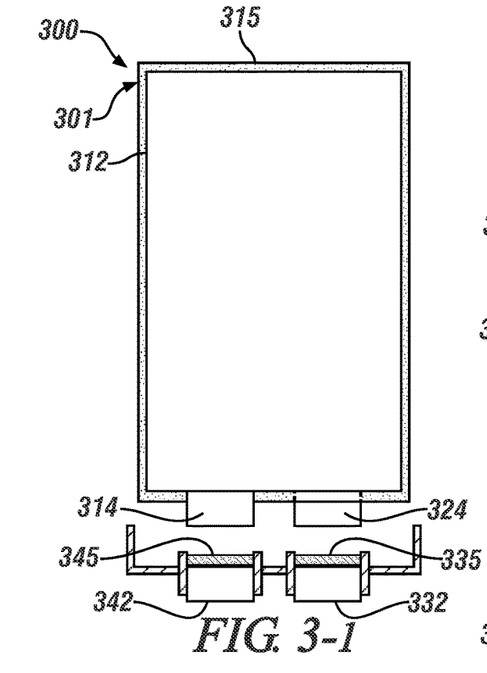
Figure 32:
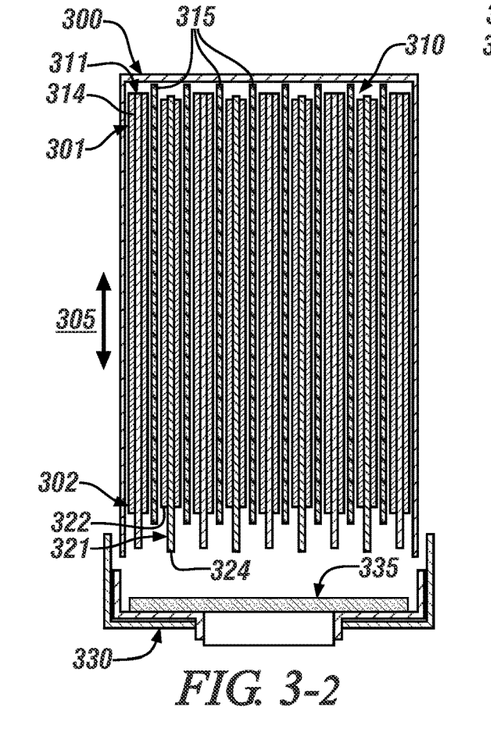

FIG. 3-1 schematically illustrates a cutaway sideview of electrode stack 310, and FIG. 3-2 schematically illustrates a corresponding cutaway end view of the electrode stack 310.

The electrode stack 310 has a plurality of alternating first and second electrodes 311, 321, respectively, that are arranged with separators 315 interposed therebetween. The electrode stack 310 includes a first end 301 and a second end 302. In one non-limiting embodiment, and as shown, the first electrode 311 is an anode, and the second electrode 321 is a cathode. Each first electrode 311 includes a first collector 312 and a first cell tab 314 that projects outwardly in a longitudinal direction 305 from the second end 302 of the electrode stack 310. Each second electrode 321 includes a second collector 322 and a second cell tab 324 that projects outwardly in the longitudinal direction 305 from the second end 302 of the electrode stack 310. As shown, the first electrode 311 is arranged on a leftward side, and the second electrode 321 is arranged on a rightward side.

The electrode stack 310 is created by forming each of the first electrodes 311, the second electrodes 321, and the separators 315 as planar sheets, and alternatingly stacking the first electrodes 311 and the second electrodes 321 with one of the separators 315 interposed therebetween to form an intermediate stack.

In one embodiment, the first electrodes 311 are composed as anodes that include a lithium host material such as graphite, silicon, or lithium titanate that is arranged on the first collector 312, which is a copper or copper alloy current collector. In one embodiment, the second electrodes 321 are composed as cathodes that include lithium-based active material that stores intercalated lithium at a higher electrochemical potential than the lithium host material used to make the anode, and is arranged on the second collector 322, which is an aluminum or aluminum alloy current collector. The separators 315 are each composed of one or more porous polymer layers that individually may be composed of one or a wide variety of polymers. Each of the one or more polymer layers may be a polyolefin. The polymer layer(s) functions to electrically insulate and physically separate the first and second electrodes 311, 321.

The second end 302 of the electrode stack 310 is assembled onto the end cap 330.

This includes the first cell tabs 314 of the first electrodes 311 being electrically connected to the first terminal 342 of the end cap 330, and being weldlessly mechanically joined to the end cap 330 via a first conductive adhesive pad 345.

This includes the second cell tabs 324 of the second electrodes 321 being electrically connected to the second terminal 332 of the end cap 330, and being weldlessly mechanically joined to the end cap 330 via a second conductive adhesive pad 335.

The first and second conductive adhesive pads 345, 335 are formed from a malleable curable conductive adhesive material. The malleable curable conductive adhesive is applied onto a surface of the end cap in an uncured state to form the second conductive adhesive pad 335, and is subjected to a curing process after assembly of the battery cell 300.

Figure 33:
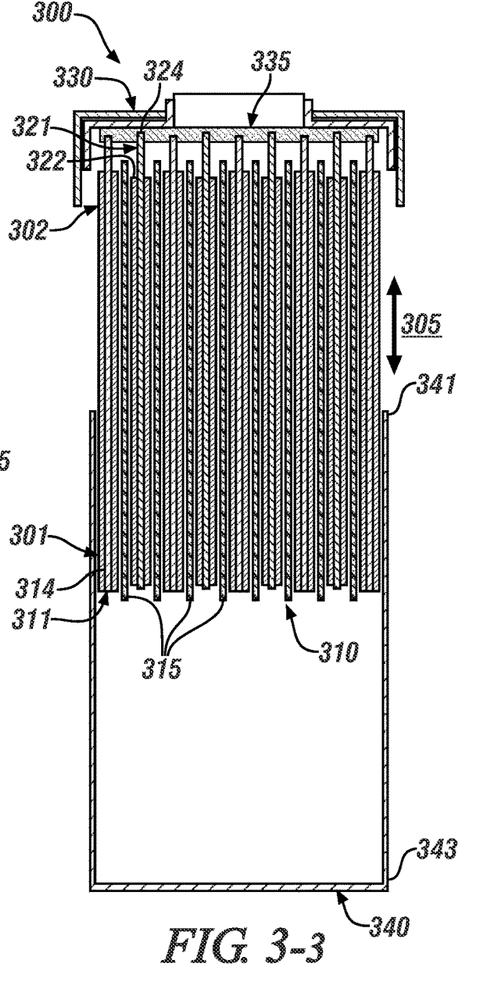
Figure 34:
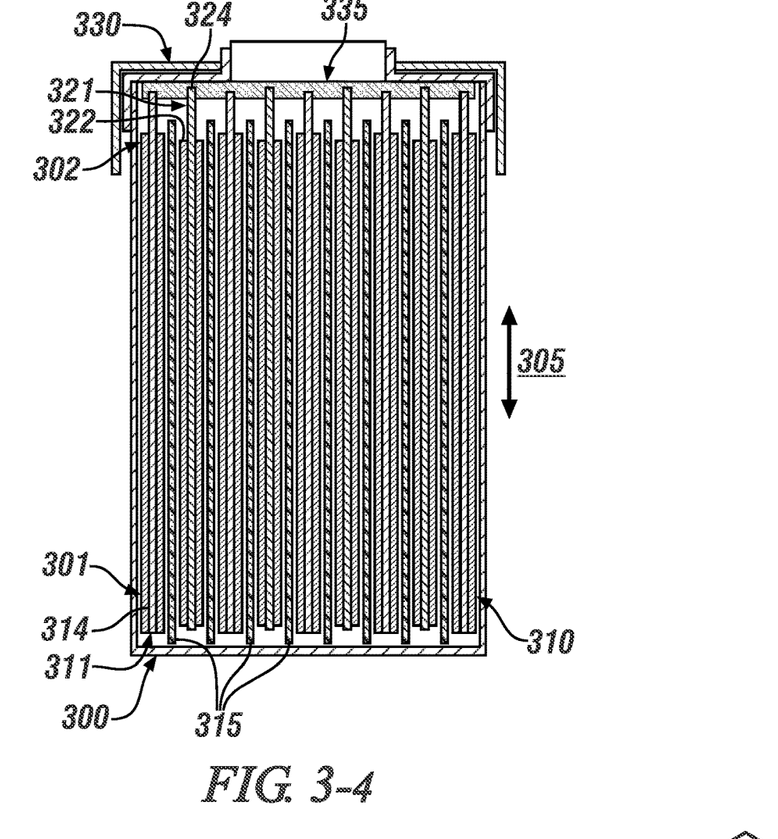

Subsequent to assembling the second end 302 of the electrode stack 310 onto the end cap 330, the first end 301 of the electrode stack 310 is inserted into the enclosure 340. This is schematically illustrated with reference to FIG. 3-3. The enclosure 340 is arranged as a rectangular prism device fabricated from a conductive polymer or other material, and has an open first end 341 and a closed second end 343.

The malleable curable conductive adhesive is applied onto an interior portion of the second end 343 of the enclosure 340 in an uncured state to form the first conductive adhesive pad 345, and electrically connects to the first terminal 342. The malleable curable conductive adhesive is subjected to a curing process after assembly of the battery cell 300.

Figure 35:
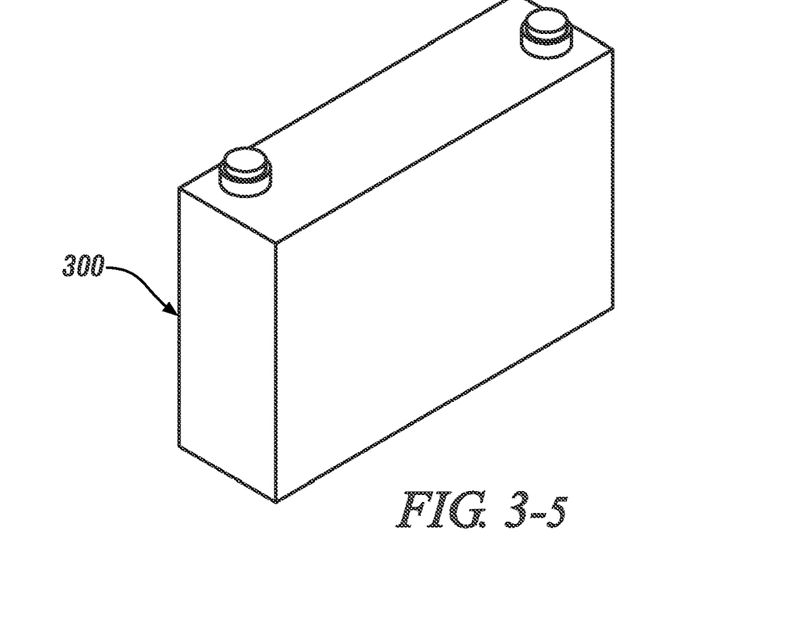

The end cap 330 is sealably attached to the enclosure 340 to form the battery cell 300, as illustrated with reference to FIG. 3-3, with embodiments of the battery cell 300 being pictorially illustrated with reference to FIG. 3-5.

FIGS. 4-1 through 4-5 illustrate details related to an embodiment of a pouch N-type battery cell (or battery module) 400 and a related assembly process, wherein positive and negative terminals are electrically connected and weldlessly, mechanically joined to an electrode stack employing an electrically conductive mechanically adhesive material. The battery cell 400 includes an electrode stack 410 that is contained with an enclosure 440, with a first end cap 45 and a second end cap 430.

Figure 44:
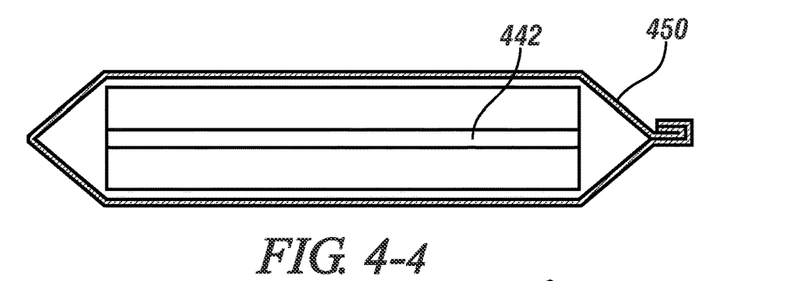

The first end cap 450 includes and defines a first terminal 442, and the second end cap 430 includes a second terminal 432. When assembled, the electrode stack 410 is sealed within the enclosure 440 using the first and second end caps 450, 430. FIG. 4-4 schematically illustrates a cutaway top view of the pouch N-type battery cell 400 including the first end cap 450A.

Figure 41:
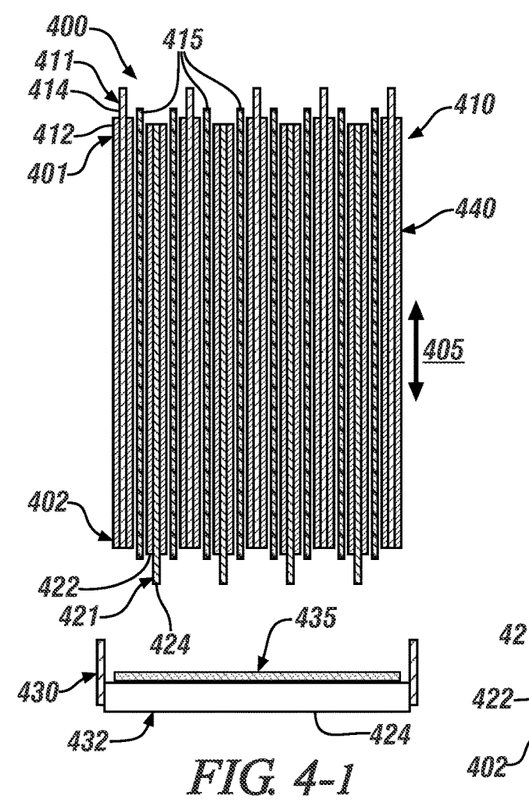

The electrode stack 410 has a plurality of alternating first and second electrodes 411, 421, respectively, that are arranged with separators 415 interposed therebetween. In one non-limiting embodiment, and as shown, the first electrode 411 is an anode, and the second electrode 421 is a cathode. Each first electrode 411 includes a first collector 412 and a first cell tab 414 that projects outwardly in a longitudinal direction 405 from a first end 401 of the electrode stack 410. Each second electrode 421 includes a second collector 422 and a second cell tab 424 that projects outwardly in the longitudinal direction 405 from a second end 402 of the electrode stack 410.

The electrode stack 410 is created by forming each of the first electrodes 411, the second electrodes 421, and the separators 415 as planar sheets, and alternatingly stacking the first electrodes 411 and the second electrodes 421 with one of the separators 415 interposed therebetween to form an intermediate stack. The first cell tabs 414 project outwardly in the longitudinal direction 405 from the first end 401 of the electrode stack 410 and the second cell tabs 424 project outwardly in the longitudinal direction 405 from the second end 402 of the electrode stack 410.

In one embodiment, the first electrodes 411 are composed as anodes that include a lithium host material such as graphite, silicon, or lithium titanate that is arranged on the first collector 412, which is a copper or copper alloy current collector. In one embodiment, the second electrodes 421 are composed as cathodes that include lithium-based active material that stores intercalated lithium at a higher electrochemical potential than the lithium host material used to make the anode, and is arranged on the second collector 422, which is an aluminum or aluminum alloy current collector. The separators 415 are each composed of one or more porous polymer layers that individually may be composed of one or a wide variety of polymers. Each of the one or more polymer layers may be a polyolefin. The polymer layer(s) function to electrically insulate and physically separate the first and second electrodes 411, 421.

The first end 401 of the electrode stack 410 is assembled onto the first end cap 450 so that the first cell tabs 414 of the first electrodes 411 electrically connect to the first terminal 442 of the first end cap 450, and weldlessly mechanically join the first cell tabs 414 to the first end cap 450 via a first conductive adhesive pad 445.

The second end 402 of the electrode stack 410 is assembled onto the second end cap 430 so that the second cell tabs 424 of the second electrodes 421 electrically connect to the second terminal 432 of the second end cap 430, and weldlessly mechanically join the second cell tabs 424 to second the end cap 430 via a second conductive adhesive pad 435.

The first and second conductive adhesive pads 445, 435 are formed from a malleable curable conductive adhesive material.

Figure 42:
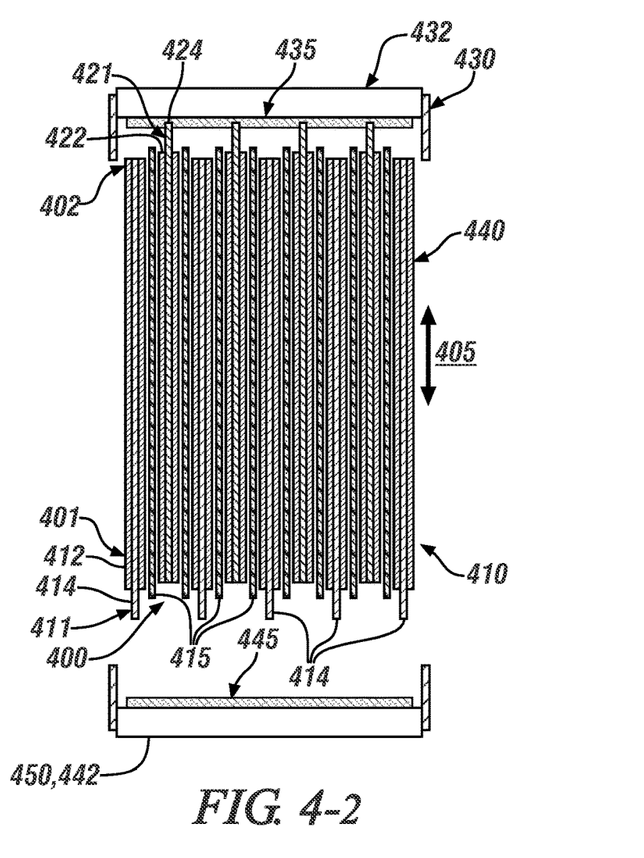

Subsequent to assembling the second end 402 of the electrode stack 410 onto the end cap 430, the first end 401 of the electrode stack 410 is inserted into the enclosure 440. This is schematically illustrated with reference to FIG. 4-2. The enclosure 440 is arranged as a rectangular prism device fabricated from a conductive polymer or other material, and has an open first end 441 and a closed second end 443. All or a portion of the enclosure 440 may function as the first terminal 442.

The malleable curable conductive adhesive is applied onto an interior portion of the second end 443 of the enclosure 440 in an uncured state to form the first conductive adhesive pad 445, and electrically connects to the first terminal 442. The malleable curable conductive adhesive is subjected to a curing process after assembly of the battery cell 400.

Figure 43:
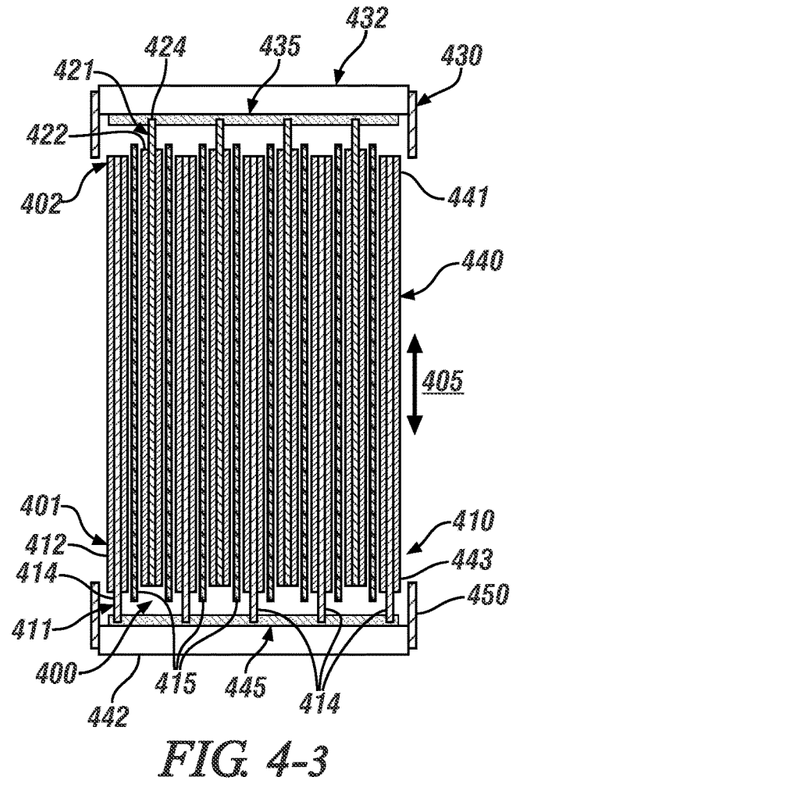
Figure 45:
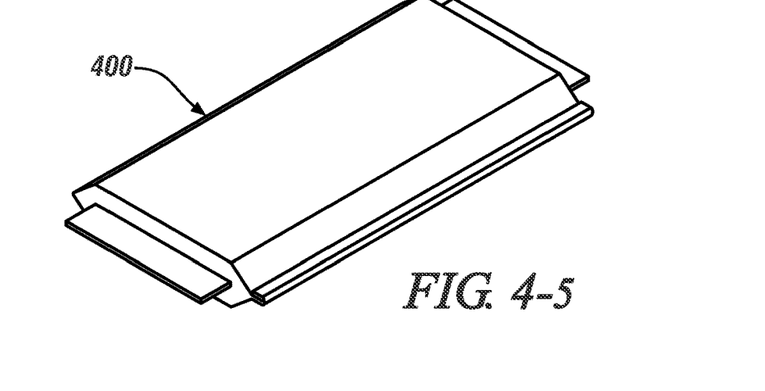

The first and second end caps 450, 430 are sealably attached to the enclosure 440 to form the battery cell 400, as illustrated with reference to FIG. 4-3, with embodiments of the battery cell 400 being pictorially illustrated with reference to FIG. 4-5.

This arrangement for assembling the pouch N-type battery cell 400 enables the electrode stack 410 to be assembled without notching or folding, thus permitting it to be inserted directly into the enclosure 440 with a pre-applied conductive adhesive and without interconnects. The end cap 430 may be adhered directly to the electrode stack 410 with conductive adhesive.

FIGS. 5-1 through 5-5 illustrate details related to an embodiment of a pouch P-type battery cell (or battery module) 500 and a related assembly process, wherein positive and negative terminals are electrically connected and weldlessly, mechanically joined to an electrode stack employing an electrically conductive mechanically adhesive material. The battery cell 500 includes an electrode stack 510 that is contained with an enclosure 540 and an end cap 530. The end cap 530 includes a first terminal 542 and a second terminal 532. When assembled, the electrode stack 510 is sealed within the enclosure 540 using the end cap 530. The end cap 530 may be assembled onto the enclosure 540 employing overmolding or using an adhesive material.

Figure 51:
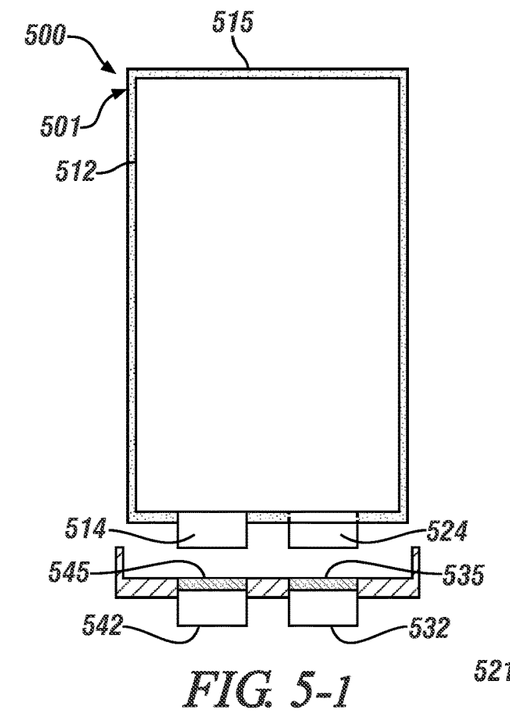
Figure 52:
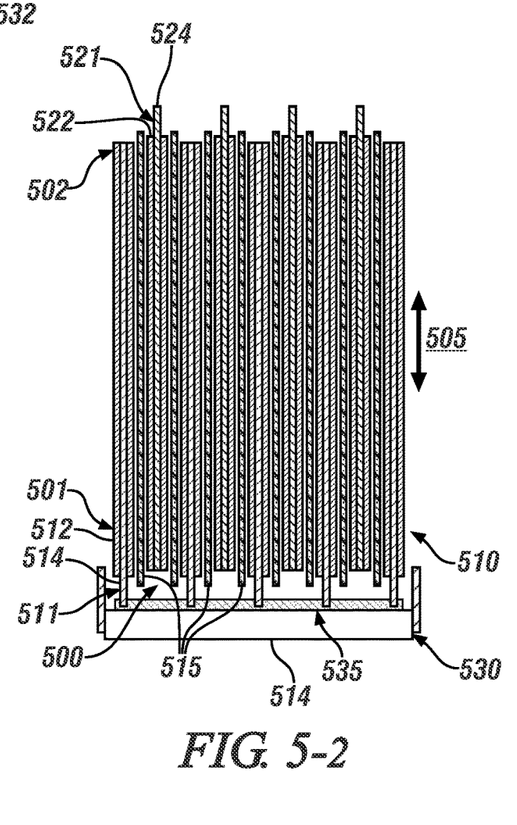

FIG. 5-1 schematically illustrates a cutaway sideview of electrode stack 510, and FIG. 5-2 schematically illustrates a corresponding cutaway end view of the electrode stack 510.

The electrode stack 510 has a plurality of alternating first and second electrodes 511, 521, respectively, that are arranged with separators 515 interposed therebetween. The electrode stack 510 includes a first end 501 and a second end 502. In one non-limiting embodiment, and as shown, the first electrode 511 is an anode, and the second electrode 521 is a cathode. Each first electrode 511 includes a first collector 512 and a first cell tab 514 that projects outwardly in a longitudinal direction 505 from the second end 502 of the electrode stack 510. Each second electrode 521 includes a second collector 522 and a second cell tab 524 that projects outwardly in the longitudinal direction 505 from the second end 502 of the electrode stack 510. As shown with reference to FIGS. 5-4 and 5-5, the first electrode 511 is arranged on a leftward side of the end cap 530, and the second electrode 521 is arranged on a rightward side of the end cap 530.

The electrode stack 510 is created by forming each of the first electrodes 511, the second electrodes 521, and the separators 515 as planar sheets, and alternatingly stacking the first electrodes 511 and the second electrodes 521 with one of the separators 515 interposed therebetween to form an intermediate stack.

In one embodiment, the first electrodes 511 are composed as anodes that include a lithium host material such as graphite, silicon, or lithium titanate that is arranged on the first collector 512, which is a copper or copper alloy current collector. In one embodiment, the second electrodes 521 are composed as cathodes that include lithium-based active material that stores intercalated lithium at a higher electrochemical potential than the lithium host material used to make the anode, and is arranged on the second collector 522, which is an aluminum or aluminum alloy current collector. The separators 515 are each composed as one or more porous polymer layers that individually may be composed of one or a wide variety of polymers. Each of the one or more polymer layers may be a polyolefin. The polymer layer(s) function to electrically insulate and physically separate the first and second electrodes 511, 521.

The second end 502 of the electrode stack 510 is assembled onto the end cap 530.

This includes the first cell tabs 514 of the first electrodes 511 being electrically connected to the first terminal 542 of the end cap 530, and being weldlessly mechanically joined to the end cap 530 via a first conductive adhesive pad 545.

This includes the second cell tabs 524 of the second electrodes 521 being electrically connected to the second terminal 532 of the end cap 530, and being weldlessly mechanically joined to the end cap 530 via a second conductive adhesive pad 535.

Each of the first and second conductive adhesive pads 545, 535 is a malleable curable conductive adhesive material. The malleable curable conductive adhesive is applied onto a surface of the end cap in an uncured state to form the second conductive adhesive pad 535, and is subjected to a curing process after assembly of the battery cell 500.

Figure 53:
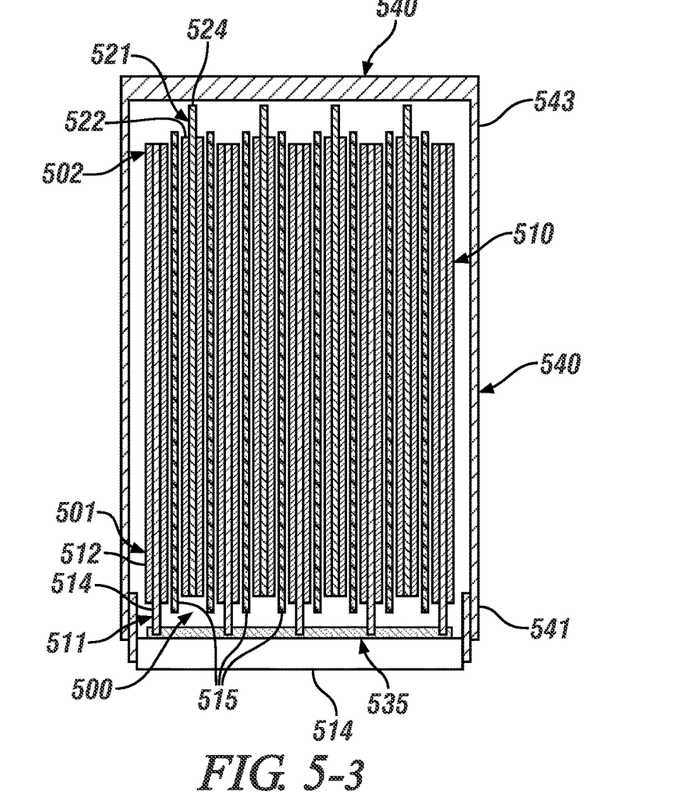
Figure 54:
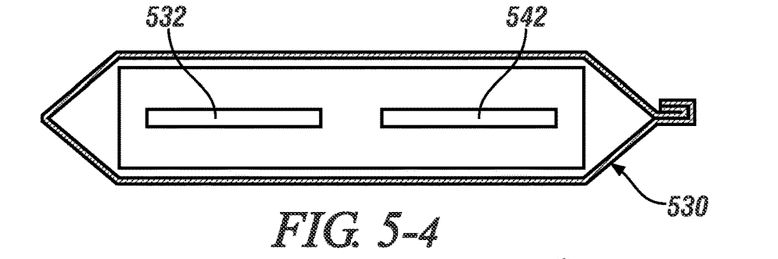

Subsequent to assembling the second end 502 of the electrode stack 510 onto the end cap 530, the first end 501 of the electrode stack 510 is inserted into the enclosure 540. This is schematically illustrated with reference to FIG. 5-3. The enclosure 540 is arranged as a rectangular prism device fabricated from a conductive polymer or other material, and has an open first end 541 and a closed second end 543.

The malleable curable conductive adhesive is applied onto an interior portion of the second end 543 of the enclosure 540 in an uncured state to form the first conductive adhesive pad 545, and electrically connects to the first terminal 542. The malleable curable conductive adhesive is subjected to a curing process after assembly of the battery cell 500.

Figure 55:
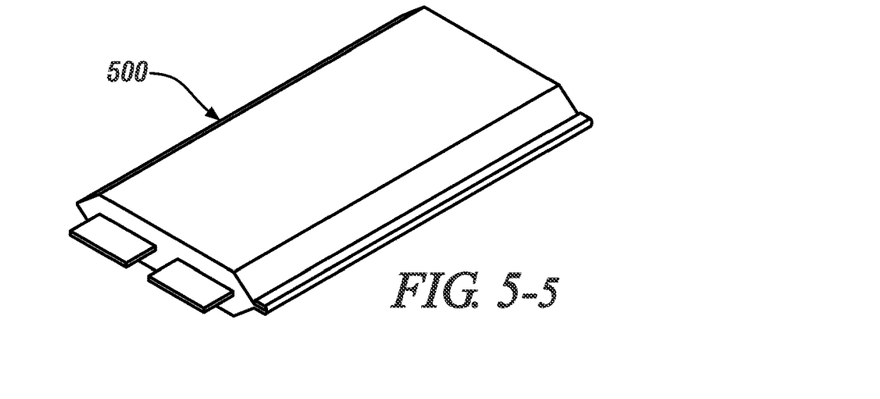

The end cap 530 is sealably attached to the enclosure 540 to form the battery cell 500, as illustrated with reference to FIG. 5-3, with embodiments of the battery cell 500 being pictorially illustrated with reference to FIG. 5-5.

Curing the malleable curable conductive adhesive includes, by way of non-limiting examples, snap cure, heat cure, room-temperature cure, or use of thermoset material or dual component conductive adhesives. Furthermore, the conductive adhesive pads described herein may be formed in place by deposition, or may be inserted after having been formed by ejection molding, 3D printing, rotational molding, injection molding, thermoforming, compression molding, blow molding, reaction injection molding, vacuum casting, resin casting.

As employed herein, the term "weldless", "weldlessly joined", "weld-free", and related terms refer to a process of joining two or more elements and a resulting junction that is formed by adhesion of the elements, and without employing heat, electrical energy, or pressure in a manner that fuses the materials of the two or more elements to form a continuum.

The concepts described herein may advantageously reduce or eliminate certain cell components that may be found on battery cells that employ welding processes as part of assembling battery cells, and the manufacturing processes. The concepts described herein may advantageously reduce or eliminate tears in foils of pouches on some embodiments. The concepts described herein may advantageously eliminate a need for external tabs on certain embodiments. The concepts described herein may advantageously preclude a need for welding processes, and thus eliminate welding-related risks such as burn-throughs, spatter, etc. The concepts described herein may advantageously facilitate electrical and mechanical connections between dissimilar metals while minimizing or eliminating risks of electrolysis and galvanic corrosion on certain embodiments. The concepts described herein may advantageously facilitate thermal conductivity to the electrodes on certain embodiments.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for assembling a battery cell, the method comprising:
   assembling an electrode stack, wherein the electrode stack includes a plurality of first electrodes, a plurality of second electrodes, and a plurality of separators;
   wherein each first electrode includes a first collector and a first cell tab,
   wherein each second electrode includes a second collector and a second cell tab,
   wherein a plurality of the first cell tabs extends from the electrode stack in a first longitudinal direction, and
   wherein a plurality of the second cell tabs extends from the electrode stack in a second longitudinal direction that is opposed to the first longitudinal direction;
   forming a first conductive adhesive pad on an end cap, wherein the first conductive adhesive pad electrically couples to a first terminal arranged on the end cap;
   forming a second conductive adhesive pad on an enclosure, wherein the second conductive adhesive pad electrically couples to a second terminal arranged on the enclosure;
   installing the end cap onto the electrode stack such that the plurality of the second cell tabs engages the second conductive adhesive pad;
   inserting the electrode stack into the enclosure such that the plurality of the first cell tabs engages the first conductive adhesive pad; and
   assembling the end cap onto the enclosure.

2. The method of claim 1, wherein installing the end cap onto the electrode stack such that the plurality of the first cell tabs engages the first conductive adhesive pad comprises installing the end cap onto the electrode stack such that the plurality of the first cell tabs electrically connects to the first conductive adhesive pad.

3. The method of claim 1, wherein inserting the electrode stack into the enclosure such that the plurality of the second cell tabs engages the second conductive adhesive pad comprises inserting the electrode stack into the enclosure such that the plurality of the second cell tabs electrically connects to the second conductive adhesive pad.

4. The method of claim 1, wherein assembling the electrode stack comprises:
   forming the plurality of first electrodes, the plurality of second electrodes, and the plurality of separators as planar sheets;
   alternatingly stacking one of the plurality of first electrodes, and one the plurality of second electrodes with one of the plurality of separators interposed therebetween to form an intermediate stack, wherein the first cell tab extends outwardly therefrom in the first longitudinal direction, and wherein the second cell tab extends outwardly therefrom in the second longitudinal direction; and
   rolling the intermediate stack into a cylindrical shape.

5. The method of claim 1, further comprising curing the first conductive adhesive pad subsequent to installing the end cap onto the electrode stack with the plurality of the first cell tabs to electrically connect the first cell tabs to the first terminal arranged on the end cap and weldlessly mechanically join the first cell tabs to the end cap.

6. The method of claim 1, further comprising curing the second conductive adhesive pad subsequent to assembling the end cap onto the enclosure to electrically connect the second cell tabs to the enclosure and weldlessly mechanically join the second cell tabs to the second terminal arranged on the enclosure.

7. The method of claim 1, wherein forming the first conductive adhesive pad on the end cap comprises applying a malleable curable conductive adhesive material onto a surface of the end cap.

8. The method of claim 7, wherein the malleable curable conductive adhesive material comprises a thermosetting polymer.

9. The method of claim 1, wherein forming the second conductive adhesive pad on the enclosure comprises applying a malleable curable conductive adhesive material onto an inner surface of the enclosure.

10. The method of claim 9, wherein curing the first conductive adhesive pad comprises applying heat to the first conductive adhesive pad.

11. A method for assembling a battery cell, the method comprising:
assembling an electrode stack, wherein the electrode stack includes a plurality of first electrodes, a plurality of second electrodes, and a plurality of separators;
wherein each first electrode includes a first collector and a first cell tab,
wherein each second electrode includes a second collector and a second cell tab,
wherein a plurality of the first cell tabs extends from a first end of the electrode stack, and
wherein a plurality of the second cell tabs extends from a second end of the electrode stack;
forming a first conductive adhesive pad on a first end cap, wherein the first conductive adhesive pad electrically couples to a first terminal on the first end cap;
installing the first end cap onto the first end of the electrode stack such that the plurality of the first cell tabs engages the first conductive adhesive pad;
forming a second conductive adhesive pad on an enclosure, wherein the second conductive adhesive pad electrically couples to a second terminal arranged on the enclosure;
inserting the electrode stack into the enclosure such that the plurality of the second cell tabs engages the second conductive adhesive pad; and
assembling the end cap onto the enclosure.

12. The method of claim 11, wherein installing the end cap onto the electrode stack such that the plurality of the first cell tabs engages the first conductive adhesive pad comprises installing the end cap onto the electrode stack such that the plurality of the first cell tabs electrically connects to the first conductive adhesive pad.

13. The method of claim 11, wherein inserting the electrode stack into the enclosure such that the plurality of the second cell tabs engages the second conductive adhesive pad comprises inserting the electrode stack into the enclosure such that the plurality of the second cell tabs electrically connects to the second conductive adhesive pad.

14. The method of claim 11, wherein assembling the electrode stack comprises:
forming the plurality of first electrodes, the plurality of second electrodes, and the plurality of separators as planar sheets; and
alternatingly stacking one of the plurality of first electrodes and one the plurality of second electrodes with one of the plurality of separators interposed therebetween,
wherein the first cell tab extends outwardly from the first end of the electrode stack, and
wherein the second cell tab extends outwardly from the second end of the electrode stack.

15. The method of claim 11, further comprising:
curing the first conductive adhesive pad subsequent to installing the end cap onto the electrode stack with the plurality of the first cell tabs to electrically connect the first cell tabs to the first terminal arranged on the end cap and weldlessly mechanically join the first cell tabs to the end cap; and
curing the second conductive adhesive pad subsequent to assembling the end cap onto the enclosure to electrically connect and weldlessly mechanically join the second cell tabs to the second terminal arranged on the enclosure.

16. An electrochemical battery module, comprising:
an electrode stack, wherein the electrode stack includes a plurality of first electrodes, a plurality of second electrodes, and a plurality of separators;
an end cap, the end cap having a first conductive adhesive pad, and a first terminal; and
an enclosure the enclosure having a second conductive adhesive pad, and a second terminal;
wherein the electrode stack is arranged within the enclosure and the end cap; wherein the first conductive adhesive pad electrically couples to the first terminal;
wherein the second conductive adhesive pad electrically couples to the second terminal; wherein the plurality of first electrodes is electrically coupled to the first terminal via the first conductive adhesive pad; and
wherein the plurality of second electrodes is electrically coupled to the second terminal via the second conductive adhesive pad.

17. The electrochemical battery module of claim 16:
wherein each of the plurality of first electrodes includes a first collector and a first cell tab;
wherein each of the plurality of second electrodes includes a second collector and a second cell tab;
wherein each of the first cell tabs of the plurality of first electrodes is electrically coupled to the first terminal and mechanically joined to the end cap via the first conductive adhesive pad; and
wherein each of the second cell tabs of the plurality of second electrodes is electrically coupled to the second terminal and mechanically joined to the end cap via the second conductive adhesive pad.

18. The electrochemical battery module of claim 16:
wherein the plurality of first electrodes, the plurality of second electrodes, and the plurality of separators are arranged as planar sheets; and
wherein the plurality of first electrodes and the plurality of second electrodes are alternatingly stacked with one of the plurality of separators interposed therebetween.

19. The electrochemical battery module of claim 18: further comprising:
the enclosure being arranged as a cylindrical device;
wherein the plurality of first electrodes, the plurality of second electrodes, and the plurality of separators are arranged in a cylindrical shape and inserted into the enclosure.

20. The electrochemical battery module of claim 16, further comprising:
wherein the plurality of first electrodes is mechanically joined to the end cap via the first conductive adhesive pad; and
wherein the plurality of second electrodes is mechanically joined to the end cap via the second conductive adhesive pad.

* * * * *